United States Patent
Mathies et al.

(10) Patent No.: US 6,284,525 B1
(45) Date of Patent: *Sep. 4, 2001

(54) MINIATURE REACTION CHAMBER AND DEVICES INCORPORATING SAME

(75) Inventors: Richard A. Mathies, Moraga; Adam T. Woolley, Albany, both of CA (US)

(73) Assignee: Affymetrix, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/651,532

(22) Filed: Aug. 29, 2000

Related U.S. Application Data

(63) Continuation of application No. 08/535,875, filed on Sep. 28, 1995, now Pat. No. 6,132,580.

(51) Int. Cl.[7] .......................... G01N 27/447; C12M 1/40
(52) U.S. Cl. ..................... 435/287.2; 435/286.1; 435/303.1; 204/601; 204/604; 204/605
(58) Field of Search .............. 435/6, 91.1, 91.2, 435/286.1, 286.5, 286.6, 303.1, 287.2, 288.3, 809, 288.5, 288.6, 288.7, 305.1, 305.2; 422/68.1, 81, 100, 101, 102; 536/25.3, 25.4; 219/201, 385, 438, 483, 490, 482, 497; 392/441, 444, 446, 447; 204/451–455, 601–606

(56) References Cited

U.S. PATENT DOCUMENTS

| | | | |
|---|---|---|---|
| 4,821,997 | * | 4/1989 | Zdeblick . |
| 4,908,112 | * | 3/1990 | Pace . |
| 4,965,188 | * | 10/1990 | Mullis et al. . |
| 5,006,749 | * | 4/1991 | White . |
| 5,110,745 | * | 5/1992 | Kricka et al. . |
| 5,126,022 | * | 6/1992 | Soane et al. . |
| 5,143,854 | * | 9/1992 | Pirrung et al. . |
| 5,188,963 | * | 2/1993 | Stapleton . |
| 5,241,363 | * | 8/1993 | Garner . |
| 5,252,294 | * | 10/1993 | Kroy et al. . |
| 5,281,516 | * | 1/1994 | Stapleton et al. . |
| 5,296,375 | * | 3/1994 | Kricka et al. . |
| 5,304,487 | * | 4/1994 | Wilding et al. . |
| 5,346,672 | * | 9/1994 | Stapleton et al. . |
| 5,382,511 | * | 1/1995 | Stapleton . |
| 5,384,261 | * | 1/1995 | Winkler et al. . |
| 5,427,946 | * | 6/1995 | Kricka et al. . |
| 5,436,129 | * | 7/1995 | Stapleton . |
| 5,451,500 | * | 9/1995 | Stapleton . |
| 5,498,392 | * | 3/1996 | Wilding et al. . |

(List continued on next page.)

FOREIGN PATENT DOCUMENTS

| | | |
|---|---|---|
| WO 90/15070 | 12/1990 | (WO) . |
| WO 92/10092 | 6/1992 | (WO) . |
| WO 93/22055 | 11/1993 | (WO) . |
| WO 93/22421 | 11/1993 | (WO) . |
| WO 94/05414 | 3/1994 | (WO) . |
| WO 96/15269 | 5/1996 | (WO) . |
| WO 98/52691 | 11/1998 | (WO) . |

OTHER PUBLICATIONS

Brenner et al., "DNA Fingerprinting by Sampled Sequencing," Proc. Nat'l Acad. Sci., 86:8902–8906 (1989).

(List continued on next page.)

Primary Examiner—William H. Beisner
(74) Attorney, Agent, or Firm—Philip L. McGarrigle; Alan B. Sherr; Ivan D. Zitkovsky

(57) ABSTRACT

The present invention generally relates to miniaturized devices for carrying out and controlling chemical reactions and analyses. In particular, the present invention provides devices which have miniature temperature controlled reaction chambers for carrying out a variety of synthetic and diagnostic applications, such as PCR amplification, nucleic acid hybridization, chemical labeling, nucleic acid fragmentation and the like.

36 Claims, 5 Drawing Sheets

U.S. PATENT DOCUMENTS

| | | | |
|---|---|---|---|
| 5,544,276 | * | 8/1996 | Loux et al. . |
| 5,587,128 | * | 12/1996 | Wilding et al. . |
| 5,593,838 | * | 1/1997 | Zanzucchi et al. . |
| 5,636,358 | * | 6/1997 | Wilding et al. . |
| 5,637,469 | * | 6/1997 | Wilding et al. . |
| 5,726,026 | * | 3/1998 | Wilding et al. . |
| 5,744,366 | * | 4/1998 | Kricka et al. . |
| 5,846,335 | * | 12/1998 | Wilding et al. . |
| 5,858,195 | * | 1/1999 | Ramsey . |
| 5,866,345 | * | 2/1999 | Wilding et al. . |
| 5,976,336 | * | 11/1999 | Dubrow et al. . |
| 6,001,229 | * | 12/1999 | Ramsey . |
| 6,001,231 | * | 12/1999 | Kopf-Sill . |
| 6,010,607 | * | 1/2000 | Ramsey . |
| 6,010,608 | * | 1/2000 | Ramsey . |
| 6,132,580 | * | 10/2000 | Mathies et al. ............. 204/453 |

OTHER PUBLICATIONS

Effenhauser et al., "Glass Chips for High–Speed Capillary Electrophoresis Separations with Submicrometer Plate Heights," *Anal. Chem.*, 65:2637–2642 (1993).

Effenhauser et al., "High–Speed Separation of Antisense Oligonucleotides on a Micromachined Capillary Electrophoresis Device," *Anal Chem.*, 66:2949–2953 (1994).

Fan and Harrison "Micromachining of Capillary Electrophoresis Injectors and Separators on Glass Chips and Evaluation of Flow at Capillary Intersections," *Anal. Chem.*, 66:177–184 (1994).

Fodor et al., "Light directed spatially addressable parallel chemical synthesis," *Science*, 251:767–777 (1991).

Ghandi, S.K. *VLSI Fabrication Principles*, $2^{nd}$ ed., John Wiley & Sons, Inc. Chapter 10, (1994).

Harrison et al., Micromachining a Miniaturized Capillary Electrophoresis–Based Chemical Analysis System on a Chip,*Science*, 261:895–897 (1993).

Horowitz and Hill, *The Art of Electronics*, Chapter 15 pp. 987–1041, Cambridge University Press 1994 ($2^{nd}$ Ed. 1994).

Jacobson et al., "Effects of Injection Schemes and Col. Geometry on the Performance of Microchip Electrophoresis Devices," *Anal. Chem.*, 66:1107–1113 (1994).

Jacobson et al, "High–Speed Separations on a Microchip," *Anal. Chem.*, 66:1114–1118 (1994).

Kuhn, et al., "DNA Helicases," *CSH–Quant. Biol.*, 43:63–67 (1978).

Manz et al., "Planar chips technology for miniaturization and integration of separation techniques into monitoring systems: Capillary electrophoresis on a chip," *J. Chromatog.*, 593:253–258 (1992).

Pfahler et al., "Liquid Transport in Micron and Submicron Channels," *Sensors and Actuators*, 431–434 (1990).

Radding, "Homologous Pairing and Strand Exchange in Genetic Recombination," *Ann. Rev. Gen.*, 16:406–4366 (1982).

Woolley and Mathies, "Ultra–high–speed DNA fragment separations using microfabricated capillary array electrophoresis chips," *Proc. Nat'l Acad. Sci. USA*, 91:11348–11352 (1994).

STIX. "Gene Readers." Scientific American. Jan. 1994, pp. 149–150, Jan. 1994.

* cited by examiner

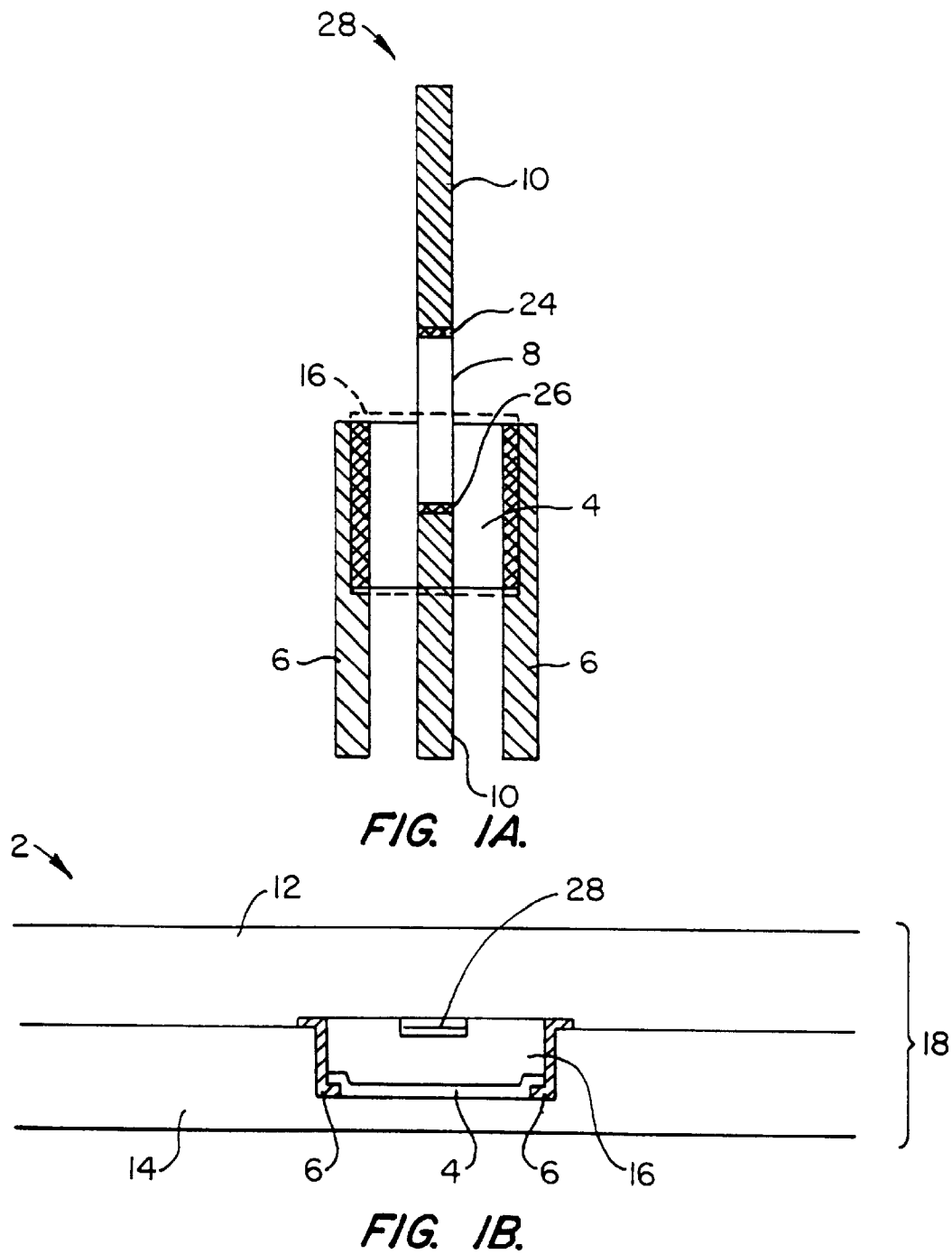

MINIATURE REACTION CHAMBER AND DEVICES INCORPORATING SAME

CROSS-REFERENCES TO RELATED APPLICATIONS

This application is a continuation of, and claims the benefit of priority from application Ser. No. 08/535,875, filed on Sep. 28, 1995, now U.S. Pat. No. 6,132,580, the full disclosure of which is incorporated herein by reference.

BACKGROUND OF THE INVENTION

The present invention generally relates to miniaturized devices for carrying out and controlling chemical reactions and analyses. In particular, the present invention provides devices which have miniature temperature controlled reaction chambers for carrying out a variety of synthetic and diagnostic applications, such as PCR amplification, nucleic acid hybridization, chemical labeling, thermal cycling, nucleic acid fragmentation, transcription, sequencing and the like.

A large number of diagnostic and synthetic chemical reactions require precise monitoring and control of reaction parameters. For example, in nucleic acid based diagnostic applications, it is generally desirable to maintain optimal temperature controls for a number of specific operations in the overall process. In particular, PCR amplification requires repeated cycling through a number of specific temperatures to carry out the melting, annealing, and ligation steps which are part of the process. By reducing reaction volumes, the amount of time required for thermal cycling may also be reduced, thereby accelerating the amplification process. Further, this reduction in volume also results in a reduction of the amounts of reagents and sample used, thereby decreasing costs and facilitating analyses of small amounts of material. Similarly, in hybridization applications, precise temperature controls are used to obtain optimal hybridization conditions. Finally, a number of other pre-and post-hybridization treatments also favor precise temperature control, such as fragmentation, transcription, chain extension for sequencing, labeling, ligation reactions, and the like.

A number of researchers have attempted to miniaturize and integrate reaction vessels for carrying out a variety of chemical reactions, including nucleic acid manipulation. For example, published PCT Application No. WO 94/05414, to Northrup and White reports an integrated micro-PCR apparatus fabricated from thin silicon wafers, for collection and amplification of nucleic acids from a specimen. Similarly, U.S. Pat. No. 5,304,487 to Wilding, et al., and U.S. Pat. No. 5,296,375 to Kricka, et al. discuss chambers and flow channels micromachined from silicon substrates for use in collection and analysis of cell samples.

The increased desire for automated chemical processes in both analytical and synthetic applications has led to a need for miniaturization and integration of existing processes and equipment for carrying out these chemical processes. The present invention meets these and other needs.

SUMMARY OF THE INVENTION

The present invention generally provides miniature temperature controlled reaction chambers and devices which incorporate them. In a first aspect, the present invention provides a miniature temperature controlled reaction chamber, which comprises a body having a cavity disposed therein. A resistive heater is disposed in the cavity, and is electrically connected to a power source for delivering a voltage across the resistive heater. The reaction chamber also includes a temperature sensor disposed on a surface of the body adjacent to or within the cavity, for determining the temperature within the cavity.

In a preferred aspect, the reaction chamber is used as an amplification chamber and comprises an effective amount of each of the four deoxynucleoside triphosphates, a nucleic acid polymerase and amplification primer sequences disposed therein.

BRIEF DESCRIPTION OF THE DRAWINGS

FIG. 1 shows a schematic illustration of one embodiment of the device of the present invention. FIG. 1A shows a top view of the reaction chamber, whereas FIG. 1B shows a side view of the reaction chamber.

FIG. 2 shows an illustration of one embodiment of the reaction chamber of the invention integrated into a capillary electrophoresis device.

DESCRIPTION OF THE SPECIFIC EMBODIMENTS

Figure 2A:
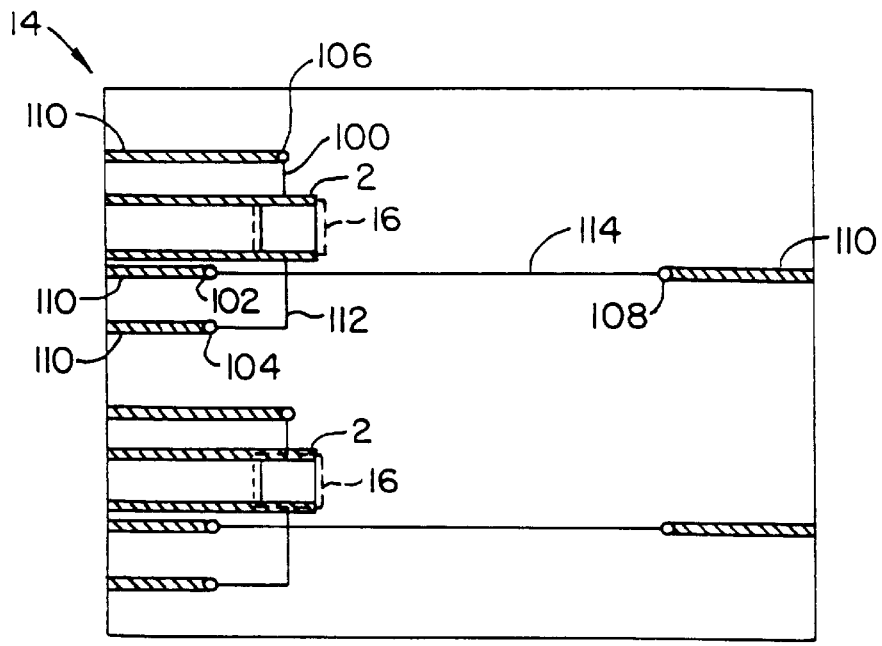
FIG. 2A shows a schematic representation of the layout of the bottom substrate having the microcapillary channels and reaction chamber well etched into the surface, with a heater and electrical leads deposited thereon.

It is a general object of the present invention to provide devices having miniature reaction chambers for carrying out a variety of chemical reactions in fluid samples. In particular, the present invention provides devices incorporating miniature reaction chambers wherein the temperature of the chamber can be monitored and controlled. Further, as miniaturized devices, the devices of the invention provide the benefits of low volume reactions (e.g., low sample and reagent volume requirements), high thermal transfer rates, flexibility of applications and integratability of additional functions, reproducible standardized mass production of the devices, ability to perform multiple simultaneous analyses/reactions in small spaces leading to greater automatability, and a variety of other advantages.

By "low volume" it is meant that the reaction chambers of the present invention will typically have a volume of from about 0.001 $\mu$l to about 10 $\mu$l. Preferably, the devices of the present invention will have a volume of from about 0.01 $\mu$l to about 1 $\mu$l and more preferably, about 0.02 $\mu$l to about 0.5 $\mu$l.

The reaction chambers and devices of the present invention have a wide variety of uses in chemical and biotechnology applications where controllable and monitorable temperatures are desirable, such as nucleic acid manipulation, e.g., amplification by PCR, extension by polymerase, thermal cycling, labelling reactions, hybridization and fragmentation reactions. In particularly preferred embodiments, the reaction chambers and devices herein described, can be used for PCR amplification, which is extremely temperature dependent. PCR amplification generally involves the use of one strand of the target nucleic acid sequence as a template for producing a large number of complements to that sequence. Generally, two primer sequences complementary to different ends of a segment of the complementary strands of the target sequence hybridize with their respective strands of the target sequence, and in the presence of polymerase enzymes and nucleoside triphosphates, the primers are extended along the target sequence. The extensions are melted from the target sequence and the process is repeated, this time with the additional copies of the target sequence synthesized in the preceding steps. PCR amplification typically involves repeated cycles of denaturation, hybridization and extension reactions to produce sufficient amounts of the target nucleic acid. The first step of each cycle of the PCR involves the separation of the nucleic acid duplex formed by the primer extension. Once the strands are separated, the next step in PCR involves hybridizing the separated strands with primers that flank the target sequence. The primers are then extended to form complementary copies of the target strands. For successful PCR amplification, the primers are designed so that the position at which each primer hybridizes along a duplex sequence is such that an extension product synthesized from one primer, when separated from the template (complement), serves as a template for the extension of the other primer. The cycle of denaturation, hybridization, and extension is repeated as many times as necessary to obtain the desired amount of amplified nucleic acid.

Typically, strand separation is achieved by heating the reaction to a sufficiently high temperature for a sufficient time to cause the denaturation of the duplex but not to cause an irreversible denaturation of the polymerase enzyme (see U.S. Pat. No. 4,965,188, incorporated herein by reference). Typical heat denaturation involves temperatures ranging from about 80° C. to 105° C. for times ranging from seconds to minutes. Strand separation, however, can be accomplished by any suitable denaturing method including physical, chemical, or enzymatic means. Strand separation may be induced by a helicase, for example, or an enzyme capable of exhibiting helicase activity. For example, the enzyme RecA has helicase activity in the presence of ATP. The reaction conditions suitable for strand separation by helicases are known in the art (See, Kuhn Hoffman-Berling, 1978, CSH-*Quantitative Biology*, 43:63–67; and Radding, 1982, *Ann. Rev. Genetics* 16:405–436, each of which is incorporated herein by reference).

Template-dependent extension of primers in PCR is catalyzed by a polymerizing agent in the presence of adequate amounts of four deoxyribonucleotide triphosphates (typically dATP, dGTP, dCTP, and dTTP) in a reaction medium which comprises the appropriate salts, metal cations, and pH buffering system. Reaction components and conditions are typically well known in the art (See, *PCR Protocols: A Guide to Methods and Applications* (Innis, M., Gelfand, D., Sninsky, J. and White, T., eds.) Academic Press (1990), previously incorporated by reference). Suitable polymerizing agents are enzymes known to catalyze template-dependent DNA synthesis.

The reaction chambers of the present invention are particularly suited for use as micro-PCR devices. In particular, the precise temperature monitoring and control within the reaction chamber allows the use of these chambers in the complex thermal cycling programs used in PCR based operations. Accordingly, in a specific aspect, the reaction chambers described herein may incorporate effective amounts of the reagents used in PCR reactions, as described above. By effective amount is meant that the reagents are provided within the reaction chamber in sufficient quantity and concentration, i.e., non-limiting amounts, so that amplification of a target nucleic acid may be carried out. Such amounts can be readily determined by those of ordinary skill in the art and may be extrapolated from, e.g., Sambrook, et al.

The reaction chambers and/or devices of the present invention can be designed and reproducibly fabricated in large quantities from a solid substrate material using a variety of known methods and materials. For example, injection molding techniques may be used to fabricate all or a portion of the reaction chamber. Materials suitable for injection moldings include a variety of plastics and other polymers, e.g., polystyrene, polypropylene, etc. Generally, the material from which the reaction chambers and devices are to be fabricated will be selected so as to provide maximum resistance to the full range of conditions to which the device will be exposed, e.g., extremes of temperature, salt, pH, application of electric fields, e.g., in electrophoretic analysis embodiments, as well as compatibility with reagents and other materials used in fabricating the devices.

In preferred embodiments, the devices of the invention which incorporate the miniature reaction chambers herein described, will be fabricated using microfabrication techniques generally used in the semiconductor and microelectronics industries. These techniques include film deposition processes such as spin coating, electrodeposition, low-pressure vapor deposition, laser fabrication processes, photolithographic methods such as UV or x-ray processes, or etching processes which may be performed by either wet chemical processes or plasma processes.

Where these microfabrication methods are used, it will generally be desirable to fabricate the reaction chamber of the invention from materials similar to those used in the semiconductor industry, i.e., silica, silicon or gallium arsenide substrates. For example, U.S. Pat. No. 5,252,294, to Kroy, et al., incorporated herein by reference in its entirety for all purposes, reports the microfabrication of a silicon based multiwell apparatus for sample handling in biotechnology applications using the above described methods.

Methods of etching substrates are well known in the art. For example, the first sheet of a substrate, e.g., silica, may be overlaid with a photoresist. A photolithographic mask may expose the photoresist in a pattern which reflects the pattern of wells to be etched on the surface of the sheet. After removing the exposed photoresist, the exposed substrate may be etched to produce the desired wells and the like. Generally preferred photoresists include those used extensively in the semiconductor industry. Such materials include polymethyl methacrylate (PMMA) and its derivatives, and electron beam resists such as poly(olefin sulfones) and the like (more fully discussed in Ghandi, "*VLSI Fabrication Principles*," Wiley (1983) Chapter 10, incorporated herein by reference in its entirety for all purposes).

The miniature reaction chambers and devices of the present invention are generally characterized by their relatively small size and ability to be used for extremely small volumes of reactants. For example, the "miniature" reaction chamber itself will generally have a volume of from about 0.001 to about 10 $\mu$l and preferably, from about 0.01 $\mu$l to about 1 $\mu$l, and most preferably, about 0.05 to 0.5 $\mu$l. This would typically result in a reaction chamber having internal dimensions of from about 0.5 mm to about 10 mm in length by about 0.5 mm to about 10 mm in width by about 5 mm to about 25 mm in depth. Although these dimensions generally imply a square reaction chamber, non square reaction chambers are typically preferred to avoid the formation of air pockets within the chamber itself. For example, round or elliptical reaction chambers having the above-described volumes will typically be preferred.

A schematic representation of one embodiment of the reaction chamber of the present invention is shown in FIGS. 1A, 1B and 1C. In this embodiment, the reaction chamber 2 is disposed within a body 18 which is made up of first and second (or bottom and top) planar members 14 and 12, respectively. These planar members are also referred to herein as "substrates", "slides" or "chips". These planar members may be made from a variety of materials, including, e.g., plastics (press molded, injection molded, machined, etc.), glass, silicon, quartz, or other silica based materials, gallium arsenide, and the like. referably, at least one of the planar members is glass. The cavity or well 16 that forms the basis of the reaction chamber is generally disposed within the first planar member 14. This cavity may be machined or etched into the surface of the first planar member, or alternatively, may be prepared in the manufacturing of the first planar member, such as where the planar member is a molded part, e.g., plastic. Temperature control for the reaction chamber is provided by a resistive heater 4 deposited within the reaction chamber. The resistive heater is shown in FIG. 1 as a thin film resistive heater deposited on the bottom surface of the reaction well. Typically, the resistive heater will comprise a thin resistive metal film, coated with an insulating layer (not shown) to prevent electrolysis at the surface of the heater, and/or electrophoresis of the sample components during operation with fluid samples. In particularly preferred embodiments, the thin metal film is a thin chromium film ranging in thickness from about 200 Å to about 4000 Å, and preferably about 3000 Å. Deposition of the heater may be carried out by a variety of known methods, e.g., vacuum evaporation, controlled vapor deposition, sputtering, chemical decomposition methods, and the like. The protective layer over the heater may comprise a number of nonconductive materials, e.g., a teflon coating, $SiO_2$, $Si_3N_4$, and the like. In particularly preferred embodiments, the heater may be coated with a $SiO_2$ layer. The $SiO_2$ layer may generally be deposited over the heater film using methods well known in the art, e.g., sputtering. Typically, this $SiO_2$ film will be from about 1000 Å to about 4000 Å thick.

The resistive heater is connected to electrical leads 6 which allow the application of a voltage across the heater, and subsequent heating of the reaction chamber. A variety of conducting materials may be used as the electrical leads, however, gold leads are preferred. In particularly preferred embodiments, the electrical leads comprise a gold/chromium bilayer, having a gold layer of from about 2000 Å to about 3000 Å and a chromium layer of from about 250 Å to about 350 Å. This bilayer structure is generally incorporated to enhance the adhesion of the gold layer to the surface of the substrate. Although FIG. 1 shows a reaction chamber of the invention having a single heating element disposed therein, it will be readily appreciated that two or more heating elements may be incorporated in the reaction chamber, i.e., on either side of the chamber, to reduce the potential for temperature gradients within the reaction chamber or across the heating element. Similarly, the heating element may be extended beyond the boundaries of the reaction chamber to accomplish the same purpose.

The apparatus of the present invention typically includes a temperature sensor incorporated within the reaction chamber. For example, the embodiment shown in FIG. 1 also shows a thermocouple 28 connected to and within cavity 16, and opposite the heater, for determination and monitoring the temperature within the reaction chamber. The thermocouple includes a pair of bimetallic junctions (a sensing junction 26 and a reference junction 24) that produce an electromotive force, or EMF, that is proportional to the difference in the temperatures at each junction. The thermocouple is then connected to a device for measuring voltage across the material, e.g., a voltmeter. The thermocouple is deposited on the surface of the second planar member 12, and is oriented such that the sensing junction of the thermocouple is electrically independent of heater 4 and its associated electrical leads 6, as illustrated in FIGS. 1A and 1B.

In preferred aspects, the thermocouple comprises two gold/chromium junctions as the reference and sensing junctions 24 and 26, respectively. The thermocouple shown in FIGS. 1 and 2 comprises two gold strips 10 which are deposited upon the second planar member (top substrate) 12. A chromium strip is then deposited to overlap the gold strips at the sensing and reference junctions. The overlapping junctions are shown in FIGS. 1 and 2 as double hatched regions. Again, the deposition of the elements of the thermocouple may be carried out using known methods as described for the deposition of the resistive heater. Also as described for the resistive heater, the gold strips of the thermocouple are preferably applied over a thin chromium layer, e.g., 250–350 Å thick. The gold strips themselves are preferably range in thickness of from about 2000 Å to about 3000 Å. The chromium element of the thermocouple is preferably from about 200 Å to about 4000 Å thick.

As with the resistive heater 4, the thermocouple will also typically include an insulating layer to prevent electrical contact with the fluid sample. This insulating layer will typically be as described for the heater, e.g., $SiO_2$ layer of from about 1000 Å to about 4000 Å thick. The temperature sensor may also be selected from other well known miniature temperature sensing devices, such as resistance thermometers which include material having an electrical resistance proportional to the temperature of the material, thermistors, IC temperature sensors, quartz thermometers and the like. See, Horowitz and Hill, The Art of Electronics, *Cambridge University Press* 1994 (2nd Ed. 1994).

The reaction chambers described herein will typically be incorporated in devices which include additional elements for sample manipulation, transport and analysis. In particular, the reaction chambers described herein will typically have an opening which is adapted for receipt of a fluid sample. Typically, these openings will include sealable closures which prevent leakage of the sample introduced into the chamber during operation. Sealable openings may include e.g., a silicone septum, a sealable valve, one way check valves such as flap valves or duck-billed check valves, or the like. Similarly, the reaction chamber may be provided with a means for removing the sample following the particular reaction. This may be the same as the sample introduction means, or may include an additional sealable opening in the reaction chamber.

In addition to openings in the chamber for sample introduction and removal, the reaction chambers herein described may be fluidly connected to additional reaction chambers to carry out any number of additional reactions. For example, one reaction chamber may be used to carry out a fragmentation reaction. Following this fragmentation reaction, the sample may be transported to a second reaction chamber for, e.g., PCR amplification of desired fragments, hybridization of the fragments to an array. Similarly, a first reaction chamber may be adapted for performing extension reactions, whereupon their completion, the sample may be transported to a subsequent reaction chamber for analysis, i.e., sequencing by capillary electrophoresis.

In particularly preferred aspects, the reaction chambers described herein are fluidly connected to one or more analytical devices or chambers, and comprise a preparative step for the particular analysis to be performed. For example, the reaction chamber may be fluidly connected to a chamber which includes an oligonucleotide array as one surface of this latter chamber. The chamber may have been used for preparative fragmentation, amplification or labeling of nucleic acid fragments in a sample, prior to introduction to the oligonucleotide array. Oligonucleotide arrays generally include a substrate having a large number of positionally distinct oligonucleotide probes attached to the substrate. These oligonucleotide arrays, also described as "Genechips™," have been generally described in the art, for example, U.S. Pat. No. 5,143,854 and PCT patent publication Nos. WO 90/15070 and 92/10092. These arrays may generally be produced using mechanical synthesis methods or light directed synthesis methods which incorporate a combination of photolithographic methods and solid phase oligonucleotide synthesis methods. See Fodor et al., *Science*, 251:767–777 (1991), Pirrung et al., U.S. Pat. No. 5,143,854 (see also PCT Application No. WO 90/15070) and Fodor et al., PCT Publication No. WO 92/10092, all incorporated herein by reference. These references disclose methods of forming vast arrays of peptides, oligonucleotides and other polymer sequences using, for example, light-directed synthesis techniques. Techniques for the synthesis of these arrays using mechanical synthesis strategies are described in, e.g., U.S. Pat. No. 5,384,261, incorporated herein by reference in its entirety for all purposes. Oligonucleotide arrays may generally be used to identify the presence of a particular known nucleic acid sequence within a sample, e.g., in diagnostic applications to identify a particular mutation, or the presence of nucleic acids from an infectious agent, such as a virus or bacteria. Alternatively, these arrays may also be used to provide de novo sequencing of nucleic acids. See U.S. patent application Ser. No. 08/082,937, filed Jun. 25, 1993, and U.S. patent application Ser. No. 08/284,064, filed Aug. 2, 1994, each of which is incorporated herein by reference in its entirety for all purposes.

In another aspect, the reaction chamber described herein may be fluidly connected to a microcapillary electrophoresis device or array, for carrying out a size based electrophoresis of a sample. Microcapillary array electrophoresis generally involves the use of a thin capillary which may or may not be filled with a particular separation medium. Electrophoresis of a sample through the capillary provides a size based separation profile for the sample. The use of microcapillary electrophoresis in size separation of nucleic acids has been reported in, e.g., Woolley and Mathies, *Proc. Nat'l Acad. Sci. USA* (1994) 91:11348–11352, incorporated herein by reference in its entirety for all purposes. Microcapillary array electrophoresis generally provides a rapid method for size based sequencing, PCR product analysis and restriction fragment sizing. The high surface to volume ratio of these capillaries allows for the application of higher electric fields across the capillary without substantial heating, consequently allowing for more rapid separations. Furthermore, when combined with confocal imaging methods, these methods provide sensitivity in the range of attomoles, which is comparable to the sensitivity of radioactive sequencing methods.

Microfabrication of capillary electrophoretic devices has been discussed in e.g., Jacobsen, et al., *Anal. Chem.* (1994) 66:1114–1118, Effenhauser, et al., *Anal. Chem.* (1994) 66:2949–2953, Harrison, et al., *Science* (1993) 261:895–897, Effenhauser, et al. *Anal. Chem.* (1993) 65:2637–2642, and Manz, et al., *J Chromatog.* (1992) 593:253–258. Typically, these methods comprise photolithographic etching of micron scale capillaries on a silica or other crystalline substrate or chip.

In many capillary electrophoresis methods, silica capillaries are filled with an appropriate separation medium. Typically, a variety of separation media known in the art may be used in the microcapillary arrays. Examples of such media include, e.g., hydroxyethyl cellulose, polyacrylamide and the like. Generally, the specific gel matrix, running buffers and running conditions are selected to maximize the separation characteristics of the particular application, e.g., the size of the nucleic acid fragments, the required resolution, and the presence of native or denatured nucleic acid molecules.

In addition to its use in nucleic acid "fingerprinting" and other sized based analyses, the capillary arrays may also be used in sequencing applications. In particular, gel based sequencing techniques may be readily adapted for capillary array electrophoresis. For example, capillary electrophoresis may be combined with the Sanger dideoxy chain termination sequencing methods as discussed in Sambrook, et al. (See also Brenner, et al., *Proc. Nat'l Acaci. Sci.* (1989) 86:8902–8906). In these methods, the sample nucleic acid is amplified in the presence of fluorescent dideoxy nucleoside triphosphates in an extension reaction. The random incorporation of the dideoxy nucleotides terminates transcription of the nucleic acid. This results in a range of transcription products differing from another member by a single base. Size based separation then allows the sequence of the nucleic acid to be determined.

Figure 2B:
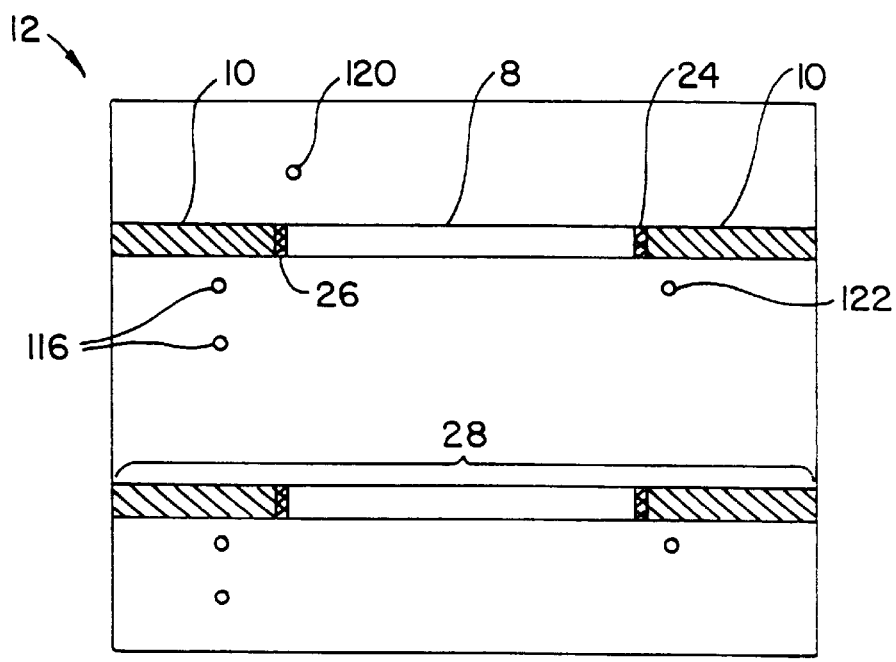
FIG. 2B shows a schematic representation of the top substrate having a thermocouple deposited thereon.
Figure 2C:
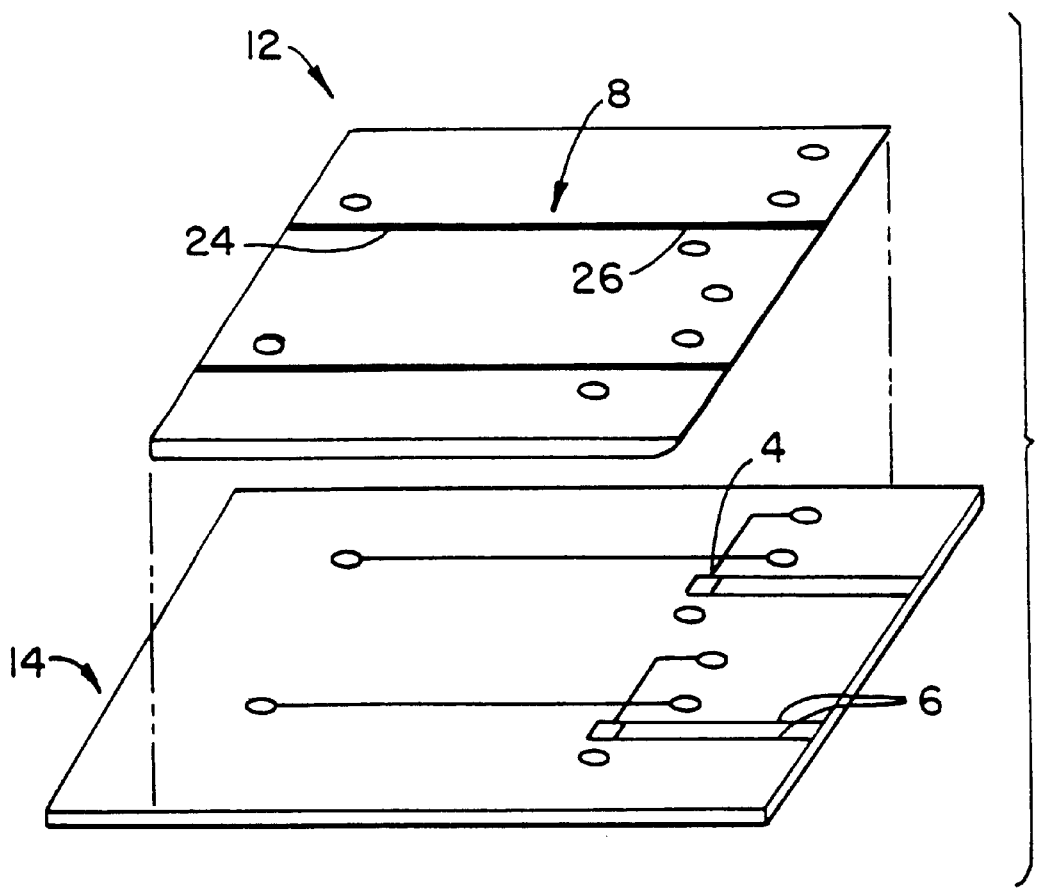
FIG. 2C shows a perspective view of the mating of the top and bottom substrates.

One example of the orientation of a reaction chamber with respect to a microcapillary electrophoresis device is shown in FIGS. 2A–2C. FIG. 2A shows the layout of the capillary channels, reaction chamber and deposited electrical leads on the first planar member. FIG. 2B shows the deposition of the thermocouple on the second planar member which mates with the first. Also shown are holes 116–122 which will form reservoirs 102–108, when the second member is mated with the first. FIG. 2C shows an overlaying of two planar members which form the overall body of the device which incorporates the reaction chamber connected to a microcapillary array.

As shown in this example, reaction chamber 2 is disposed within the sample introduction channel 100 of a microcapillary device. A sample is introduced into sample reservoir 106, from which it is transported to the reaction chamber 2. Reservoirs 102, 104 and 108 are generally filled with running buffer for the particular electrophoresis. The sample is generally loaded in the capillary channel 112, by applying an electrical current across sample reservoir 106 and buffer reservoir 104, for plug loading, or across reservoirs 102 and 106, for stack loading. The application of the electrical currents across these reservoirs is via electrical leads 110. Following sample loading, an electrical field is applied across buffer reservoir 102 and waste reservoir 108, electrophoresing the sample through the capillary channel 114.

In addition to including one or more of the above described elements, the reaction chambers of the present invention may also include one or more additional elements which aid in the particular reaction/analytical operation of the reaction chamber, including, e.g., mixers, pumps, valves, vents and the like.

Often, the convective forces resulting from the heating of a fluid sample within a reaction chamber will be sufficient to adequately mix that sample. However, in some cases it may be desirable to provide additional mixing elements. A variety of methods and devices may be employed for mixing the contents of a particular reaction chamber. For example, mixing may be carried out by applying external agitation to the reaction chamber. Typically, however, the reaction chambers of the present invention have incorporated therein, devices for mixing the contents of the reaction vessel. Examples of particularly suitable mixing methods include electroosmotic mixing, wherein the application of an electric field across the sample results in a movement of charged components within the sample and thus the mixing of the sample. Alternative suitable mixers include lamb-wave transducers which may be incorporated into the reaction chambers. See, Published PCT Application No. WO 94/05414.

The reaction chambers described herein will also typically include a means for delivering a fluid sample to the reaction chamber as well as a means for removing the sample from the chamber. This may include a simple sample introduction and removal port whereby the sample is manually introduced and/or removed from the reaction chamber, as described above. However, as the reaction chambers of the invention are typically integrated within devices which include additional reaction/analysis chambers, it will typically be desirable to include one or more micropumps for transporting a fluid sample from one chamber to another. A number of positive displacement micropumps have been described for micron/submicron scale fluid transport including lamb-wave devices, see U.S. Pat. No. 5,006,749, electrokinetic pumps, diaphragm pumps, applied pressure differentials and the like. In particularly preferred embodiments, applied pressure differentials are used to affect fluid transport within the device, i.e., between two or more reaction chambers. In particular, the device may be provided with a pressure or vacuum manifold which can be used to selectively apply a pressure differential between two reaction chambers, forcing a sample to move from a high pressure chamber to a low pressure chamber. Selective application of the pressure differentials can be carried out manually, i.e., applying a vacuum or pressure to a particular reaction chamber through an opening in the chamber, or it may be carried out using a pressure manifold employing valves as described herein, which valves may be selectively operated to direct pressure or vacuum to a given reaction chamber upon demand, or according to a programmed protocol.

As referenced above, valve structures can also typically be included in devices which incorporate the reaction chambers herein described. Typically, these valves will include, e.g., a deflectable diaphragm which when in a non-deflected position, rests against a valve seat blocking fluid flow between, e.g., a reaction chamber and a fluid channel. Deflection of the diaphragm thus allows fluid flow between the reaction chamber and fluid channel.

For a number of applications, it may be desirable to include a vent within a given reaction chamber. Typically, this will be the case where reaction conditions result in the evolution or expansion of gas or fluid within the chamber. Such vents will typically be fitted with a poorly wetting filter plug to allow for the passage of gas, while retaining liquid.

Control of reaction parameters within the reaction chamber may be carried out manually, but is preferably controlled via an appropriately programmed computer. In particular, the EMF from the thermocouple and the input for the power source will typically be interfaced to a computer which is programmed to receive and record data via an analog digital/digital-analog (AD/DA) converter. The same computer will typically include programming for instructing the delivery of appropriate current to allow the reaction chamber to follow any number of predetermined time/temperature profiles, e.g., thermal cycling for PCR, and the like.

Figure 3:
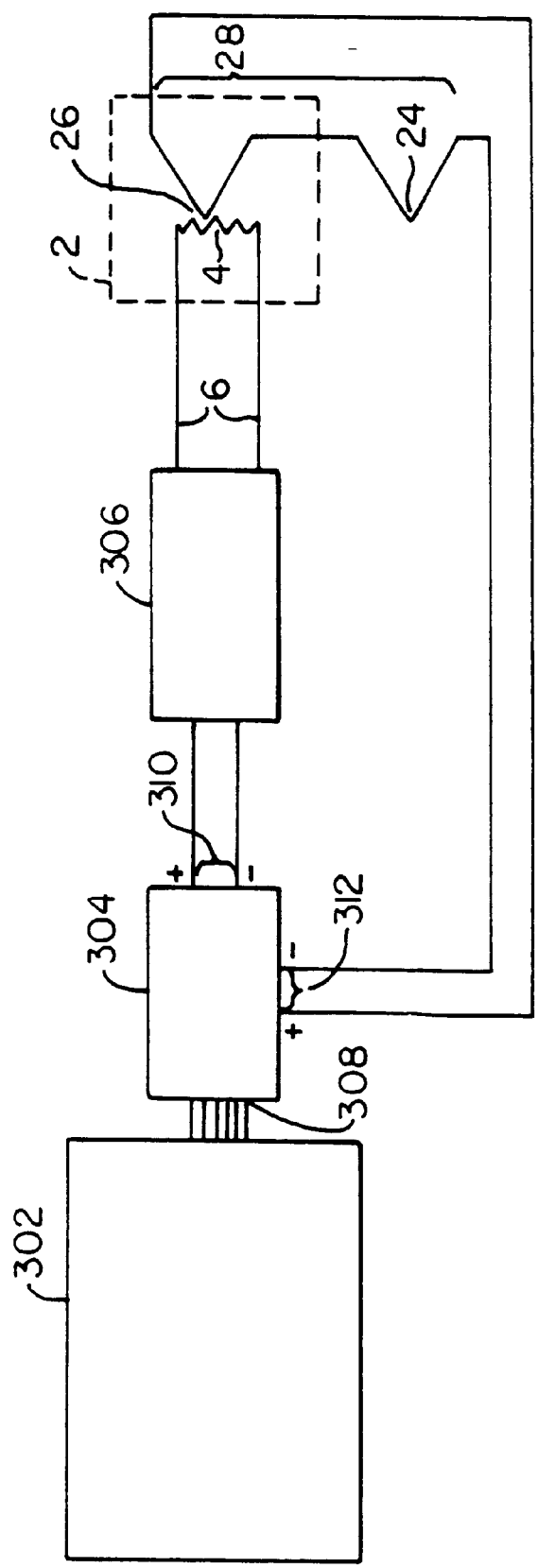
FIG. 3 shows a control system and power source integrating the reaction chamber of the invention.

An illustrated embodiment of the control system is shown in FIG. 3. An appropriately programmed computer 302 is connected to the digital input and output 308 of an AD/DA converter 304. Upon delivery of a digital signal to the converter, the converter converts the digital signal to an analog signal. The analog output 310 of the converter 304 is connected to an amplifier 306 which amplifies the analog signal. Suitable amplifiers include low power amplifiers, such as audio amplifiers, e.g., $2SV_{rms}$, 20W. The amplifier is then connected via positive and negative leads to the heater 4 within the reaction chamber 2. For embodiments using smaller heating elements, the voltage from the converter may be sufficient to heat the heater, thereby eliminating the need for the amplifier.

The sensing junction 26 of the thermocouple 28 is also disposed within the reaction chamber. The reference junction 24 is disposed away from the reaction chamber. The thermocouple is then connected to the analog input of the AD/DA converter. The EMF from the thermocouple is relayed to an analog input 312 of the converter 304 and is translated to a digital signal and reported to the computer 302. The computer maintains the voltage across the heater until the desired temperature is reached. When this temperature is reached within the reaction chamber, the voltage is discontinued across the heater which is then cooled by the ambient temperature surrounding the reaction chamber. When the temperature falls below the desired level, the computer again applies a voltage across the heater. The reaction chamber is generally cooled by ambient air temperature, although supplemental cooling may also be provided, e.g., water baths, coolant systems, fans, pelletier coolers, etc. Where the temperature is to be maintained at an elevated level, i.e., well above ambient temperature, the system operates as a thermostat to maintain an approximately static temperature. The computer may be programmed to sample the output from the thermocouple at regular intervals, e.g., 1 sample/second, 1 sample/b seconds etc. Typically, the computer will also provide a display of the actual and programmed temperatures at a given time point, or over a programmed temperature profile.

In preferred embodiments, an AC voltage is applied across the heater, while the thermocouple provides a DC signal. This allows further differentiation between the electrical signal delivered to the heater and that received from the thermocouple by reducing the electrical "noise" measured by the thermocouple.

Although generally described as comprising two planar members, in many embodiments, each planar member may be made up of a plurality of individual elements, e.g., layers to accomplish the equivalent structure. For example, the reaction well may be formed from the mating of two substrate layers where one layer has an opening disposed therethrough. The edges of the opening will become the sides of the resulting well whereas the surface of the other substrate will become the bottom surface of the well. Furthermore, additional elements may be included within the two planar members, or may be disposed in an additional part, e.g., a third, fourth, fifth, etc. planar member. For example, flow channels may be disposed in a third planar member overlaying either the first or second member. Holes disposed through the first or second planar member can then connect these flow channels to one or more reaction chambers. This third planar member may be bonded to the reaction chamber containing body, or may be detachable, allowing rotation, or substitution with different flow channel conformations to carry out a multiplicity of varied operations. Similarly, the ability to substitute flow channel conformations can allow a single reaction chamber body to be custom fabricated to carry out any number of a variety of different applications. A third planar member may also include vacuum manifolds for operation of fluid transport systems such as pumps, valves and the like, or may include electrical circuits for operation of, or connection to the various electrical components, e.g., heaters, valves, pumps, temperature sensors, microprocessors for controlling the reaction chamber, and batteries for providing a power source for operation of these components.

The present invention is further illustrated by the following examples. These examples are merely to illustrate aspects of the present invention and are not intended as limitations of this invention.

EXAMPLES

Example 1
Fabrication of Reaction Chamber Device

The reaction chamber device of the invention has been fabricated using standard photolithographic masking and wet chemical etching techniques. Channels are formed by thermally bonding an etched bottom substrate to drilled top substrate. 50 mm ×75 mm glass microscope slides were used for both substrates. All glass substrates were cleaned with Nova Clean detergent, acetone, methanol, water and hot $H_2SO_4/H_2O_2$, followed by a final water rinse. The bottom piece was coated with a film of Shipley S1400-31 photoresist by spinning at 6000 RPM for 30 seconds, and then the photoresist was soft-baked at 90° C. for 25 minutes. The photoresist was then patterned with a UV radiation source through a mask having the desired channel/well pattern. The portions of exposed photoresist were dissolved in a 1:1 mixture of water and Microposit Developer Concentrate, after which the undissolved portions are hardened by heating at 1500C for 60 minutes. The channels were etched into the glass to a depth of approximately $\mu m$ with a 1:1 mixture of commercially available 5:1 and 10:1 Buffered Oxide Etch, which etches the glass at an approximate rate of 0.5 $\mu m$/min. The remaining photoresist was removed by immersing the pieces in hot $H_2SO_4/H_2O_2$.

The electrical leads for the heating element comprised a gold chromium bilayer. The chromium was employed to provide better adhesion of the gold to the glass. Chromium strips approximately 250 Å thick, were vacuum deposited on the bottom substrate, leading into the bottom of the etched well. 2000 Å thick gold electrodes were vacuum deposited overlaying the chromium strips.

A chromium film approximately 5 mm×5 mm, was vacuum deposited on the bottom surface of the etched well as the resistive heater. The chromium film was approximately 2000 Å thick, and was expected to have a resistance of approximately 5–50 ohms. A heater this size requires approximately 1 Watt of power, which necessitated the inclusion of an amplifier between the computer and the heater.

The top and bottom portions of the substrate were aligned so that the sensing junction of the thermocouple was placed over the reaction well including the heater. The alignment was such that the heater and thermocouple were not in electrical contact. Following alignment, the substrates were placed in a programmable vacuum furnace and heated to 600° C. for 2 hours to bond the pieces together.

Example 2
Thermal Cycling

Figure 4:
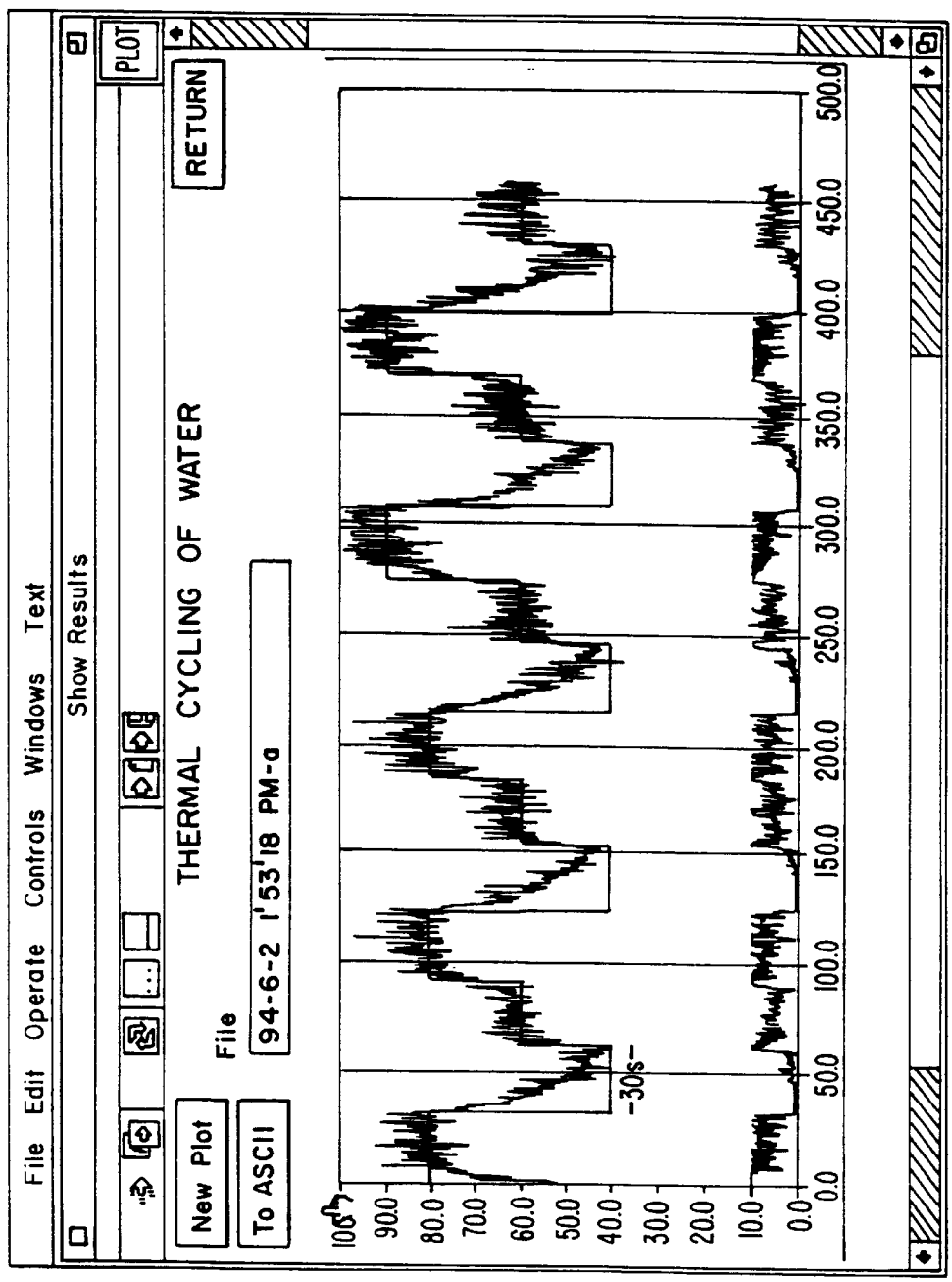
FIG. 4 is a computer display and graphic user interface for operation of the reaction chamber of the invention. The display shows a plot of a thermal cycling profile of water in the reaction chamber of the invention. The straight lines indicate the programmed temperature profile, whereas the jagged lines indicate actual temperature as measured from the thermocouple. The thermal cycling profile was programmed for 80° C. for 30 seconds, followed by 40° C. for 30 seconds, then 60° for 30 seconds, which was repeated.

A reaction chamber was prepared using the above methods, except for bonding of the two substrates. An Apple Macintosh Quadra 650 computer was programmed to cycle the temperature of the chamber up to 80° C. for 30 seconds, down to 40° C. for 30 seconds and then up to 60° C. for 30 seconds, repeat the cycle twice more, and then raise the upper temperature to 90° C. Cooling was provided by the ambient atmosphere. The computer was connected to a MIO-16XL DA/AD converter. The analog output was connected to the input of a 25 $V_{rms}$, 20 W audio amp which was in turn connected to the leads of the heater. The gold leads of the thermocouple were connected to the analog input of the converter. The thermocouple was calibrated as delivering approximately 0.0167 mV/°C. which was used to convert the digital signal to a temperature reading. A water sample was introduced into the reaction chamber and the thermal cycling program was begun. FIG. 4 shows the actual temperature as measured by the thermocouple (top jagged line), the programmed temperature profile (straight line) and the voltage applied to the heater (bottom jagged line).

While the foregoing invention has been described in some detail for purposes of clarity and understanding, it will be clear to one skilled in the art from a reading of this disclosure that various changes in form and detail can be made without departing from the true scope of the invention. All publications and patent documents cited in this application are incorporated by reference in their entirety for all purposes to the same extent as if each individual publication or patent document were so individually noted.

What is claimed is:

1. A miniature reaction system comprising:
   a body having a cavity disposed therein;
   effective amounts of reaction components disposed within said cavity;
   a heater deposited within said cavity, said heater being electrically connected to a power source;
   a temperature sensor in thermal contact with said cavity;
   an appropriately programmed computer for monitoring said temperature and controlling said power source; and
   a microcapillary gel electrophoresis device comprising a first gel filled microcapillary extending from the cavity, and a second gel filed microcapillary intersecting across the first gel filled microcapillary, the second gel filled microcapillary being in fluid communication with the first gel filled microcapillary, said second gel filled microcapillary comprising an electrophoretic channel.

2. The reaction system of claim 1, wherein said reaction components comprise the components necessary for a sequencing reaction.

3. The reaction system of claim 1, wherein said reaction components comprise the components necessary for a transcription reaction.

4. The reaction system of claim 1 wherein said reaction components comprise the components necessary for a restriction digest.

5. The reaction system of claim 1, wherein said reaction components comprise the components necessary for a nucleic acid fragmentation reaction.

6. The reaction system of claim 1, wherein said reaction components comprise the components necessary for a chemical labeling reaction.

7. The reaction system of claim 1, wherein said temperature sensor is disposed on a surface of said body within said cavity.

8. A miniature reaction system comprising:

a body having a cavity disposed therein;

a heater deposited within said cavity, said heater being electrically connected to a power source;

a temperature sensor in thermal contact with said cavity;

an appropriately programmed computer for monitoring said temperature and controlling said power source; and a microcapillary gel electrophoresis device comprising a first gel filled microcapillary extending from the cavity, and a plurality of gel filed microcapillaries intersecting across the first gel filled microcapillary, the plurality of gel filled microcapillaries being in fluid communication with the first gel filled microcapillary, said plurality of gel filled microcapillaries comprising electrophoretic channels.

9. The reaction system of claim 8, wherein said temperature sensor is disposed on a surface of said body within said cavity.

10. A miniature reaction system comprising:

a body having a cavity disposed therein;

a heater deposited within said cavity, said heater being electrically connected to a power source;

a temperature sensor in thermal contact with said cavity;

an appropriately programmed computer for monitoring said temperature and controlling said power source; and a microcapillary gel electrophoresis device comprising a first gel filled microcapillary extending from the cavity, and a second gel filled microcapillary intersecting across the first gel filled microcapillary, the second gel filled microcapillary being in fluid communication with the first gel filled microcapillary, said second gel filled microcapillary comprising an electrophoretic channel.

11. A miniature reaction system comprising:

a body having a cavity disposed therein;

a heater deposited within said cavity, said heater being electrically connected to a power source;

a temperature sensor in thermal contact with said cavity;

an appropriately programmed computer for monitoring said temperature and controlling said power source;

a gel filled microcapillary extending from the cavity; and a reaction chamber in fluid communication with the gel filled microcapillary, the reaction chamber having a nucleic acid array disposed therein, said nucleic acid array including a substrate having a plurality of positionally distinct nucleic acid probes coupled to a surface of said substrate.

12. The miniature reaction system of claim 10 or 11, wherein said body comprises at least first and second planar members, said first planar member having a first surface and a well disposed in said first surface, said second planar member having a second substantially planar surface, said second surface being mated to said first surface whereby said well forms said cavity.

13. The reaction system of claim 10 or 11, wherein said cavity has a volume of from about 0.001 $\mu$l to about 1 $\mu$l.

14. The reaction system of claim 10 or 11, wherein said cavity has a volume of from about 0.01 $\mu$l to about 1 $\mu$l.

15. The reaction system of claim 10 or 11, wherein said cavity has a volume of from about 0.05 $\mu$l to about 0.5 $\mu$l.

16. The reaction system of claim 10 or 11, wherein said temperature sensor comprises a thermocouple separate from the heater and having a sensing junction positioned adjacent said cavity, and a reference junction positioned outside of said cavity, said thermocouple being electrically connected to a voltage measuring device.

17. The reaction system of claim 16, wherein said means for measuring a voltage across said thermocouple measures a DC voltage.

18. The reaction system of claim 16, wherein said thermocouple comprises a first gold film adjoined to a chromium film as said sensing junction and said chromium film adjoined to a second gold film as said reference junction.

19. The reaction system of claim 10 or 11, wherein said heater comprises a metallic film and said electrical connection comprises two gold leads overlaying said metallic film and being electrically connected to said power source.

20. The reaction system of claim 19, wherein said metallic film is between about 250 and about 4000 Å thick.

21. The reaction system of claim 19, wherein said gold leads comprise a gold film overlaying a chromium layer.

22. The reaction system of claim 21, wherein said gold film is between about 1000 and 4000 Å thick and said chromium layer is between about 200 and 300 Å thick.

23. The reaction system of claim 16, wherein the appropriately programmed computer measures a voltage across said thermocouple and provides a voltage across said heater to maintain said cavity at a desired temperature.

24. The reaction system of claim 10 or 11, wherein each of said heater and said temperature sensor are electrically insulated from said cavity by an insulating layer.

25. The reaction system of claim 24, wherein said insulating layer comprises a SiO2, Si3N4 or PTFE layer.

26. The reaction system of claim 12, wherein each of said heater and said temperature sensor are electrically insulated from said cavity by an insulating layer.

27. The reaction system of claim 26, wherein said insulating layer comprises a SiO2, Si3N4 or PTFE layer.

28. The reaction system of claim 26, wherein said insulating layer is disposed across substantially all of said first surface, and a portion of said second surface which portion is positioned opposite said well.

29. The reaction system of claim 26, wherein said insulating layer is coating substantially all of said second surface and bottom and side surfaces of said well.

30. The reaction system of claim 12, further comprising an opening disposed through at least one of said first planar member and said second planar member for introducing or removing a fluid sample from said well.

31. The reaction system of claim 11, further comprising a means for transporting a fluid sample between said cavity and said reaction chamber.

32. The reaction system of claim 31, wherein said means for transporting fluid comprises a micropump, said micropump being fluidly connected to at least one of said cavity and said reaction chamber.

33. The reaction system of claim 10 or 11, further comprising an effective amount of four deoxynucleoside triphosphates, a nucleic acid polymerase and amplification primer sequences disposed within said cavity.

34. The reaction system of claim 10 or 11, further comprising a means for mixing a fluid sample within said cavity.

35. The reaction system of claim 34, wherein said means for mixing comprises a lamb wave transducer disposed adjacent said cavity.

36. The reaction system of claim 31, wherein said means for transporting fluid comprises electrophoresis between said cavity and said reaction chamber.

* * * * *